(12) United States Patent
Yang et al.

(10) Patent No.: US 10,865,298 B2
(45) Date of Patent: Dec. 15, 2020

(54) MODIFIED POLYETHYLENES

(71) Applicant: Dow Global Technologies LLC, Midland, MI (US)

(72) Inventors: Yunfeng Yang, Shanghai (CN); Hongyu Chen, Shanghai (CN); Alexander Williamson, Freeport, TX (US); Kalyan Sehanobish, Midland, MI (US); Jorge Caminero Gomes, Jundiai (BR); Yu Cai, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 8 days.

(21) Appl. No.: 16/329,260

(22) PCT Filed: Aug. 31, 2016

(86) PCT No.: PCT/CN2016/097518
§ 371 (c)(1),
(2) Date: Feb. 28, 2019

(87) PCT Pub. No.: WO2018/039968
PCT Pub. Date: Mar. 8, 2018

(65) Prior Publication Data
US 2019/0225786 A1  Jul. 25, 2019

(30) Foreign Application Priority Data

Aug. 31, 2016 (WO) ............... PCT/CN2016/097518

(51) Int. Cl.
| | | |
|---|---|---|
| *C08L 23/26* | (2006.01) | |
| *C08L 23/08* | (2006.01) | |
| *C08F 255/02* | (2006.01) | |
| *C08K 5/11* | (2006.01) | |
| *C08K 5/14* | (2006.01) | |
| *C08K 5/17* | (2006.01) | |
| *C08K 5/23* | (2006.01) | |

(52) U.S. Cl.
CPC ............ *C08L 23/26* (2013.01); *C08F 255/02* (2013.01); *C08K 5/11* (2013.01); *C08K 5/14* (2013.01); *C08K 5/17* (2013.01); *C08K 5/23* (2013.01); *C08L 23/0815* (2013.01); *C08L 2207/062* (2013.01); *C08L 2207/064* (2013.01); *C08L 2207/066* (2013.01); *C08L 2310/00* (2013.01)

(58) Field of Classification Search
CPC ................ C08L 23/26; C08L 23/0815; C08L 2207/062; C08L 2207/064; C08L 2207/066; C08L 2310/00; C08F 255/02; C08K 5/11; C08K 5/14; C08K 5/23
See application file for complete search history.

(56) References Cited

U.S. PATENT DOCUMENTS

| | | |
|---|---|---|
| 8,541,419 B2 | 9/2013 | Tai |
| 2004/0127628 A1 | 7/2004 | Walton et al. |
| 2014/0131910 A1* | 5/2014 | Kohlstrung et al. ...... C08J 9/103 264/54 |
| 2015/0239997 A1 | 8/2015 | DeFrancisci et al. |
| 2019/0106557 A1* | 4/2019 | Sun et al. ................ C08F 8/00 |

FOREIGN PATENT DOCUMENTS

| | | | |
|---|---|---|---|
| CN | 102382265 | 3/2012 | |
| CN | 102504113 | 6/2012 | |
| CN | 103539896 | 1/2014 | |
| GB | 1 465 844 | * 3/1977 | ............... C08J 9/06 |
| JP | S60166335 | 8/1985 | |
| JP | S60188412 | 9/1985 | |
| JP | 2007091776 | 4/2007 | |
| JP | 2013004646 | 1/2013 | |
| JP | 2015099876 | 5/2015 | |

OTHER PUBLICATIONS

International Search Report & Written Opinion for related PCT Application PCT/CN2016/097518, dated May 27, 2017 (13 pgs).
International Preliminary Report on Patentability for related PCT Application PCT/CN2016/097518, dated Jan. 2, 2019 (8 pgs).
In 1373 MUM 2013 A (Relieance IND LTD) Apr. 17, 2015 "A Process for Preparing High Melt Strength Polyolefins"; Reliance Industries Limited (41 pgs).
Ghasemi, et al., "The Effect of Co-agent on the Peroxide Cross-Linking of LDPE"; Department of Plastics, Iran Polymer and Petrochemical Institute, Iranian Polymer Journal, No. 12, vol. 2 (2003) 7 pgs.

* cited by examiner

*Primary Examiner* — Nathan M Nutter
(74) *Attorney, Agent, or Firm* — Brooks, Cameron & Huebsch, PLLC

(57) ABSTRACT

A composition includes polyethylene; a multifunctional co-agent having a functionality of 3 or greater, where the multifunctional co-agent is from 100 to 2000 ppm based upon the polyethylene; and a free radical generator, where the free radical generator is from 5 to 100 ppm based upon the polyethylene. Such composition may be utilized to form modified polyethylenes.

11 Claims, 2 Drawing Sheets

MODIFIED POLYETHYLENES

This application is a National Stage Application under 35 U.S.C. § 371 of International Application Number PCT/CN2016/097518, filed Aug. 31, 2016 and published as WO 2018/039968 on Mar. 8, 2018, the entire contents of which are incorporated herein by reference in its entirety.

FIELD OF DISCLOSURE

Embodiments of the present disclosure are directed towards modified polyethylenes, more specifically, embodiments are directed towards modified polyethylenes formed by utilizing a multifunctional co-agent having a functionality of 3 or greater and a free radical generator.

BACKGROUND

Polymers may be utilized for a number of articles including films and pipes, among others. Polymers can be formed by reacting one or more types of monomer in a polymerization reaction. There is continued focus in the industry on developing new and improved materials and/or methods that may be utilized to form polymers having one or more desirable properties.

SUMMARY

The present disclosure provides compositions including: polyethylene; a multifunctional co-agent having a functionality of 3 or greater, where the multifunctional co-agent is from 100 to 2000 ppm based upon the polyethylene; and a free radical generator, where the free radical generator is from 5 to 100 ppm based upon the polyethylene.

The present disclosure provides methods for forming a modified polyethylene including compounding a composition including: polyethylene; a multifunctional co-agent having a functionality of 3 or greater, where the multifunctional co-agent is from 100 to 2000 ppm based upon the polyethylene; and a free radical generator, where the free radical generator is from 5 to 100 ppm based upon the polyethylene.

The present disclosure provides modified polyethylenes formed by compounding a composition including: polyethylene; a multifunctional co-agent having a functionality of 3 or greater, where the multifunctional co-agent is from 100 to 2000 ppm based upon the polyethylene; and a free radical generator, where the free radical generator is from 5 to 100 ppm based upon the polyethylene.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
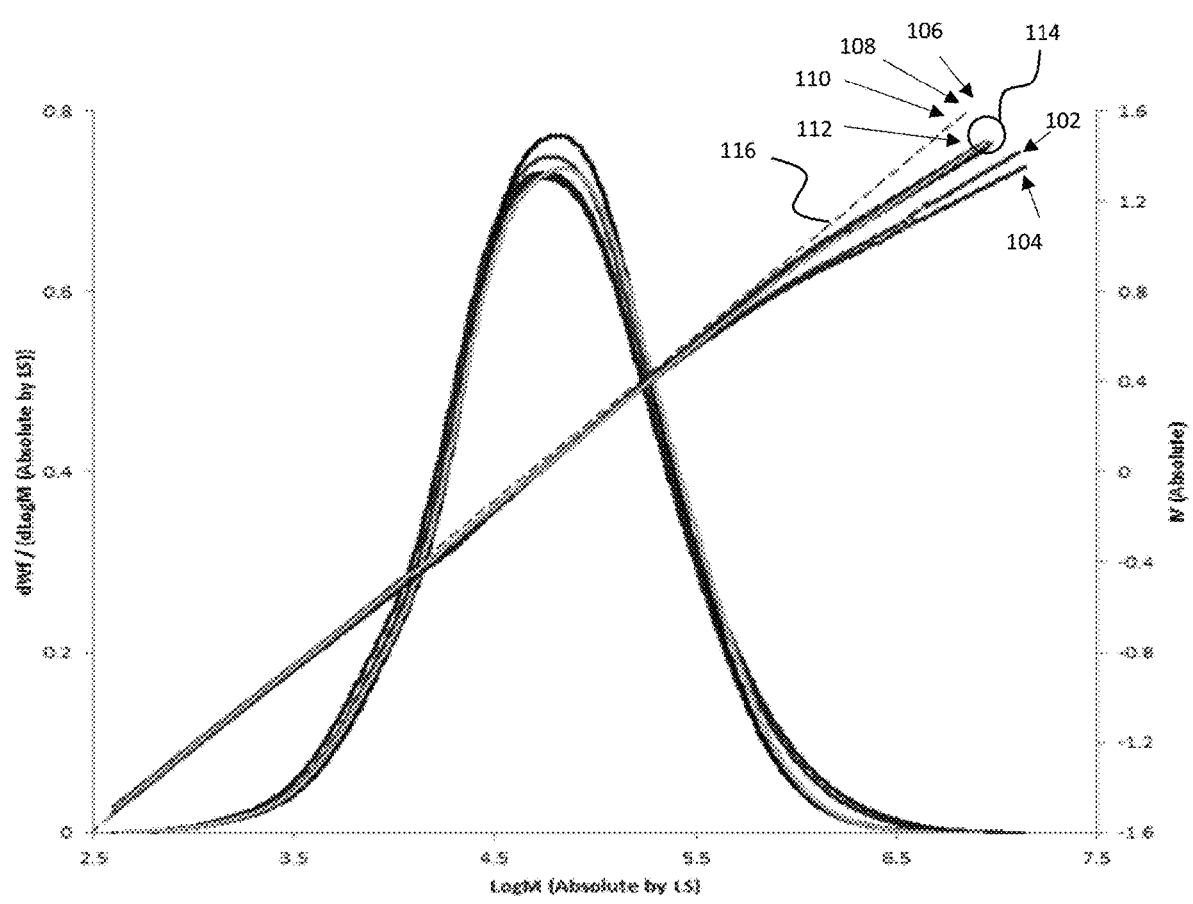
FIG. 1 is a Mark-Houwink plot for a number of modified polyethylenes formed from compositions including the free radical generator and the multifunctional co-agent according to one or more embodiments disclosed herein; for polyethylenes formed from compositions including a free radical generator while lacking the multifunctional co-agent; and for polyethylene formed from a composition not including a free radical generator.

Compositions that may be utilized to form modified polyethylenes, methods for forming modified polyethylenes, and modified polyethylenes formed therefrom are described herein. As an example, a composition that may be utilized to form a modified polyethylene may include polyethylene, a multifunctional co-agent having a functionality of 3 or greater, where the multifunctional co-agent is from 100 to 2000 parts-per-million (ppm) based upon the polyethylene, and a free radical generator, where the free radical generator is from 5 to 100 ppm based upon the polyethylene. As used herein, "ppm" refers to mass, e.g., kg/kg.

For a number of applications, polyethylenes having an improved gel count, e.g., a reduced gel count as compared to other polyethylenes, may be desirable. Surprisingly, the compositions disclosed herein can be utilized to form modified polyethylenes having an improved gel count as compared to other polyethylenes.

A "gel" can be described as a mass that is not blended into the surrounding material, e.g., such that the mass can be seen by visual inspection, particularly if the surrounding material is a transparent material. As an example, a mass of crosslinked and/or partially crosslinked material may not blend into the surrounding material. For polyethylene, gels can be aesthetically displeasing as the gels can be visually observed on the surface of films and laminates. Further, gels can reduce the quality of printing on the polyethylene. Additionally, gels can adversely impact polyethylene performance. For example, gels can undesirably provide mechanically weak areas, which can result in film breaks in stretch applications, e.g., perforated diaper back sheets, packaging stretch wrap, fiber breakage during fiber spinning, and hoop stress failure in pipe applications.

In addition to an improved gel count, high melt strengths may be desirable for polyethylene. "Melt strength" can be described as a resistance of the resin, e.g., polyethylene, melt to stretching, e.g., the maximum tension that can be applied to the melt without breaking. Without being bound by theory, it is believed that the melt strength of a material is related to the molecular chain entanglements of the resin and its resistance to untangling under strain.

Some previous approaches have utilized a free radical generator to increase the melt strength of polyethylene. However, utilizing the free radical generator to obtain a desired melt strength may result in a decrease of a melt index, which may be undesirable for a number of applications. Additionally, utilizing the free radical generator to obtain a desired melt strength may result in an increase of a gel count measurement, e.g., an increased number of gels, which may be undesirable for a number of applications as previously discussed.

As mentioned, the compositions disclosed herein may be utilized to form a modified polyethylene. Utilizing both the multifunctional co-agent having a functionality of 3 or greater, where the multifunctional co-agent is from 100 to 2000 ppm based upon the polyethylene, and the free radical generator, where the free radical generator is from 5 to 100 ppm based upon the polyethylene, as disclosed herein, can provide a number of surprising and/or desirable benefits. These modified polyethylenes can provide an improved gel count and/or an improved melt strength, as compared to other polyethylenes. Further, these modified polyethylenes can have a melt index that is maintained at a higher level, as compared to other polyethylenes.

Embodiments of the present disclosure provide that the compositions disclosed herein include a polyethylene. The polyethylene, which may be utilized to form the modified polyethylenes, may include linear low density polyethylene (LLDPE), metallocene catalyzed linear low density polyethylene (mLLDPE), high density polyethylene (HDPE), medium density polyethylene (MDPE), very low density polyethylene (VLDPE), and combinations thereof. For instance, the polyethylene, which may be utilized to form the modified polyethylenes, may include a LLDPE and a mLLDPE; a HDPE and a MDPE; or a LLDPE, a HDPE, and a VLDPE, among others.

LLDPE can be made utilizing a Ziegler-Natta catalyst. The LLDPE may be a heterogeneous LLDPE. The LLDPE can be an ethylene-alpha-olefin copolymer where the comonomers may have from 4 to 10 carbon atoms. As used herein "mLLDPE" refers to a LLDPE that is formed by utilizing a metallocene catalyst. HDPE can be a linear high density polyethylene homopolymer that made utilizing a Ziegler or a metallocene catalyzed polymerization process. MDPE can be made by utilizing chromium/silica catalysts, Ziegler-Natta catalysts, metallocene catalysts, or a combination thereof. MDPE can have a density from 0.926-0.940 g/cm$^3$. VLDPE can be formed by utilizing a metallocene catalyst. VLDPE can have a density from 0.880-0.915 g/cm$^3$.

The polyethylene, which may be utilized to form the modified polyethylenes, may have a density ranging from 0.865 g/cm$^3$ to 0.970 g/cm$^3$. All individual values and subranges from 0.865 g/cm$^3$ to 0.970 g/cm$^3$ are included; for example, the polyethylene may have a density from a lower limit of 0.865, 0.870, 0.875, 0.880, 0.885, 0.900, 0.902, 0.905, 0.907, 0.910, 0.912, 0.915, 0.920, 0.925, 0.926, 0.930, 0.935, or 0.940 g/cm$^3$ to an upper limit of 0.970, 0.965, 0.960, 0.955, 0.950, 0.945, 0.942, 0.940, 0.937, 0.935, 0.930, 0.927, 0.925, 0.922, 0.920, 0.918, or 0.915 g/cm$^3$. Density may be determined by ASTM D 792, for instance.

The polyethylene, which may be utilized to form the modified polyethylenes, may have a melt index ranging from 0.01 g/10 min to 30 g/10 min. All individual values and subranges from 0.01 g/10 min to 30 g/10 min are included; for example, the polyethylene may have a melt index from a lower limit of 0.01, 0.05, 0.1, 0.25, 0.5, 1, 3, 5, 7, 10, 12, 15, 18, 20, 23, or 25 g/10 min to an upper limit of 30, 27, 25, 22, 20, 17, 15, 12, 10, 8, 5, 2, 1, 0.9, 0.7, or 0.5 g/10 min.

Examples of the polyethylene, which may be utilized to form the modified polyethylenes, include polyethylene homopolymers, polyethylene copolymers, and polyethylene interpolymers, in which greater than 50 percent by weight of the polymer is derived from ethylene. As used herein, "copolymer" refers to a polymer having units derived from two different monomers and interpolymer means a polymer having units derived from three or more different monomers. The polyethylene may be a homogeneously branched or heterogeneously branched and/or unimodal or multimodal, e.g., bimodal, polyethylene. As used herein, "unimodal" refers to the molecular weight distribution (MWD) in a gel permeation chromatography (GPC) curve does not substantially exhibit multiple component polymers, i.e., no humps, shoulders or tails exist or are substantially discernible in the GPC curve. In other words, the degree of separation is zero or substantially close to zero. As used herein, "multimodal" refers to the MWD in a GPC curve exhibits two or more component polymers, wherein one component polymer may even exist as a hump, shoulder or tail relative to the MWD of the other component polymer.

As mentioned, the polyethylene, which may be utilized to form the modified polyethylenes, may include interpolymers of ethylene and at least one comonomer. Examples of suitable comonomers include alpha-olefins. Suitable alpha-olefins include those containing from 3 to 20 carbon atoms (C3-C20). For instance, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the polyethylene can be an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decease. In other embodiments, the polyethylene can be an ethylene/alpha-olefin copolymer, wherein the alpha-olefin is selected from the group consisting of propylene, 1-butene, 1-hexene, and 1-octene. In further embodiments, the polyethylene can be an ethylene/alpha-olefin copolymer, wherein the alpha-olefin is selected from the group consisting of 1-hexene and 1-octene.

In some embodiments, the polyethylene, which may be utilized to form the modified polyethylenes, can be an ethylene/alpha-olefin copolymer that comprises greater than 50%, by weight, of the units derived from ethylene. All individual values and subranges of greater than 50%, by weight, are included and disclosed herein. For example, the polyethylene can be an ethylene/alpha-olefin copolymer that may comprise at least 60%, at least 70%, at least 80%, at least 90%, at least 92%, at least 95%, at least 97%, at least 98%, at least 99%, at least 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene. The polyethylene can be an ethylene/alpha-olefin copolymer that may comprise less than or equal to 30%, by weight, of units derived from one or more alpha-olefin comonomers. All individual values and subranges of less than or equal to 30%, by weight, are included herein and disclosed herein. For example, the polyethylene can be an ethylene/alpha-olefin copolymer that may comprise less than 25%, less than 20%, less than 18%, less than 15%, less than 12%, less than 10%, less than 8%, less than 5%, less than 4%, less than 3%, from 0.2 to 15%, 0.2 to 12%, 0.2 to 10%, 0.2 to 8%, 0.2 to 5%, 0.2 to 3%, 0.2 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, among other techniques.

In some embodiments, the polyethylene, which may be utilized to form the modified polyethylenes, is an ethylene/alpha-olefin copolymer that may comprise at least 90 percent by moles of units derived from ethylene. All individual values and subranges from at least 90 mole percent are included herein and disclosed herein; for example, the polyethylene can be an ethylene/alpha-olefin copolymer that may comprise at least 93 percent, at least 95 percent, at least 96 percent, at least 97 percent, at least 98 percent, at least 99 percent, by moles, of units derived from ethylene; or in the alternative, the polyethylene can be an ethylene/alpha-olefin copolymer that may comprise from 90 to 99.5 percent, from 90 to 99 percent, from 90 to 97 percent, from 90 to 95 percent, from 92 to 99.5, from 92 to 99 percent, from 92 to 97 percent, from 95 to 99.5, from 95 to 99 percent, from 97 to 99.5 percent, or from 97 to 99 percent, by moles, of units derived from ethylene. The polyethylene can be an ethylene/alpha-olefin copolymer that may comprise less than or equal to 15 percent by moles of units derived from one or more a-olefin comonomers. All individual values and subranges from less than or equal to 15 mole percent are included herein and disclosed herein. For example, the polyethylene is an ethylene/alpha-olefin copolymer that may comprise less than 12 percent, less than 10 percent, less than 8 percent, less than 7 percent, less than 5 percent, less than 4 percent, or less than 3 percent, by moles, of units derived from one or more alpha-olefin comonomers; or in the alternative, the polyethylene can be ethylene/alpha-olefin copolymer that may comprise from 0.5 to 15 percent, from 0.5 to 12 percent, from 0.5 to 10 percent, 0.5 to 8 percent, 0.5 to 5 percent, 0.5 to 3 percent, 1 to 12 percent, 1 to 10 percent, 1 to 8 percent, 1 to 5 percent, 2 to 12 percent, 2 to 10 percent, 2 to 8 percent, 2 to 5 percent, 3 to 12 percent, 3 to 10 percent, 3 to 7 percent, by moles of units derived from one or more alpha-olefin comonomers. The comonomer content may be measured using any suitable technique, such as techniques based on NMR spectroscopy, and, for example, by 13C NMR analysis as described in U.S. Pat. No. 7,498,282, among other techniques.

Other examples of suitable polyethylenes, which may be utilized to form the modified polyethylenes, include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. Nos. 3,914,342 or 5,854,045), all of which is incorporated by reference. In some embodiments, the polyethylene may include DOWLEX™ polyethylenes sold by The Dow Chemical Company from including, for example, DOWLEX™ 2045G, NG 2045B, 2049B, 2685, TG 2085B, 2038, or 2050; among other linear low density polyethylenes from The Dow Chemical Company; or linear low density polyethylenes sold by Nova Chemicals Corp., including, for example, SCLAIR™ FP120 and NOVAPOL™ TF-Y534.

The polyethylene, which may be utilized to form the modified polyethylenes, can be made via gas-phase, solution-phase, or slurry polymerization processes, or combinations thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable polyethylenes may be produced according to the processes described at pages 15-17 and 20-22 in WO 2005/111291 A1, for instance, which is herein incorporated by reference. The catalysts used to make the polyethylenes described herein may include Ziegler-Natta, chrome, metallocene, constrained geometry, or single site catalysts, for example. In some embodiments, the polyethylene may be a unimodal LLDPE prepared using a single stage polymerization, e.g. slurry, solution, or gas phase polymerization. In other embodiments, the polyethylene may be a unimodal LLDPE prepared in a loop reactor, for example, in a single stage loop polymerization process. Loop reactor processes are further described in WO/2006/045501 or WO2008104371, for example. Multimodal, e.g. bimodal, polyethylenes can be made by mechanical blending of two or more separately prepared polyethylene components and/or prepared in-situ in a multistage polymerization process. In some embodiments, the polyethylene may be a multimodal LLDPE prepared in-situ in a multistage, i.e. two or more stage, polymerization or by the use of one or more different polymerization catalysts, including single-, multi- or dual site catalysts, in a one stage polymerization. For example, the polyethylene may be a multimodal LLDPE produced in at least two-stage polymerization using the same catalyst, e.g., a single site or Ziegler-Natta catalyst, as described in U.S. Pat. No. 8,372,931, which is herein incorporated by reference. Thus, for example two solution reactors, two slurry reactors, two gas phase reactors, or any combinations thereof, in any order can be employed, such as disclosed in U.S. Pat. No. 4,352,915 (two slurry reactors), U.S. Pat. No. 5,925,448 (two fluidized bed reactors), and U.S. Pat. No. 6,445,642 (loop reactor followed by a gas phase reactor). However, in other embodiments, the polyethylene may be a multimodal polymer, e.g. LLDPE, made using a slurry polymerization in a loop reactor followed by a gas phase polymerization in a gas phase reactor, as disclosed in EP 2653392 A1, which is herein incorporated by reference.

Embodiments of the present disclosure provide that the compositions disclosed herein include a multifunctional co-agent having a functionality of 3 or greater, where the multifunctional co-agent is from 100 to 2000 ppm based upon the polyethylene. As used herein, "co-agents" are materials that can promote crosslinking, e.g., by helping to establish a higher concentration of reactive sites and/or helping to reduce the chance of deleterious radical side reactions.

Co-agents can be described as being one of two types, i.e. type-1 co-agents and type-2 co-agents. Type-1 co-agents are typically polar and generally have a lower molecular weight than type-2 co-agents. While not bound to theory, type-1 co-agents may form highly reactive radicals through addition reactions, for example. The generated radicals can couple with polyethylene chain radicals, thus form more a branched structure, e.g., long chain branching (LCB). In contrast to type-1 co-agents, type-2 co-agents form less reactive radicals that are generated primarily through hydrogen abstraction. Type-2 co-agents include allyl-containing cyanurates, isocyanurates and phthalates, homopolymers of dienes, and co-polymers of dienes and vinyl aromatics. Embodiments of the present disclosure provide that the multifunctional co-agent can be a type-1 co-agent.

As used herein, "multifunctional" refers to having a plurality of functionalities. As used herein, "functionality" refers to carbon-carbon double bonds. The carbon-carbon double bonds may be terminal. As such, a multifunctional co-agent having a functionality of 3 or greater refers to a material having 3 or more double bonds. In contrast, a difunctional material would have 2 double bonds, for instance.

Embodiments of the present disclosure provide that the multifunctional co-agent having a functionality of 3 or greater can be selected from acrylate compounds, methacrylate compounds, vinyl compounds, allyl compounds, and combinations thereof. For instance, the multifunctional co-agent having a functionality of 3 or greater can be an acrylate compound having a functionality of 3 or greater, a methacralyate compound having a functionality of 3 or greater, a vinyl compound having a functionality of 3 or greater, an allyl compound having a functionality of 3 or greater, or a combination thereof. Examples of the multifunctional co-agent having a functionality of 3 or greater include dipentaerythritol pentaacrylate and trimethylolpropane triacrylate, among others.

Embodiments of the present disclosure provide that the compositions, which may be utilized to form the modified polyethylenes, can include 100 to 2000 ppm of the multifunctional co-agent having a functionality of 3 or greater based upon the polyethylene. All individual values and subranges from 100 to 2000 ppm are included; for example, the multifunctional co-agent can be from a lower limit of 100, 150, 200, 250, 300, 350, 400, 450, or 500 to an upper limit of 2000, 1900, 1800, 1700, 1600, 1500, 1400, 1300, 1200, 1100, 1000, 900, 800, or 700 ppm based upon the polyethylene.

Embodiments of the present disclosure provide that the compositions disclosed herein include a free radical generator. The free radical generator may have a half-life at 220° C. of less than or equal to 200 seconds and a decomposition energy higher than, i.e., more negative than, −250 kJ/mol. In one or more embodiments, the free radical generator has a half-life at 220° C. of less than 175 seconds, 150 seconds, or 125 seconds. In other embodiments, the free radical generator has a half-life at 220° C. of from 60 to 200 seconds, 60 to 175 seconds, 60 to 150 second, 60 to 125 seconds, or 60 to 120 seconds.

The free radical generator may have a molecular weight from 200 to 1000 Daltons. All individual values and subranges of from 200 to 1000 Daltons are included and disclosed herein; for example, the free radical generator may have a molecular weight from a lower limit of 200, 225, 250, 300, 325, or 350 to an upper limit of 1000, 975, 950, 925, 900, 875 or 850 Daltons.

In one or more embodiments, the free radical generator may be a cyclic peroxide. An example of a suitable cyclic peroxide may be represented by the following formula:

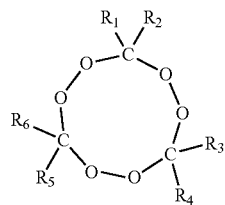

wherein $R_1$-$R_6$ are each independently hydrogen or an inertly-substituted or unsubstituted C1-C20 alkyl, C3-C20 cycloalkyl, C6-C20 aryl, C7-C20 aralkyl, or C7-C20 alkaryl. Representative of the inert-substituents included in $R_1$-$R_6$ are hydroxyl, C1-C20 alkoxy, linear or branched C1-C20 alkyl, C6-C20 aryloxy, halogen, ester, carboxyl, nitrile, and amido. In one or more embodiments, $R_1$-$R_6$ are each independently lower alkyls, including, for example, C1-C10 alkyl, or C1-C4 alkyl.

A number of cyclic peroxides are commercially available, e.g., under the tradename TRIGONOX®, such as 3,6,9-triethyl-3,6,9-trimethyl-1,4,7-triperoxonane. Further, cyclic peroxides can be made by contacting a ketone with hydrogen peroxide as described in U.S. Pat. No. 3,003,000; Uhlmann, 3rd Ed., Vol. 13, pp. 256-57 (1962); the article, "Studies in Organic Peroxides XXV Preparation, Separation and Identification of Peroxides Derived from Methyl Ethyl Ketone and Hydrogen Peroxide," Milas, N. A. and Golubovic, A., J. Am. Chem. Soc, Vol. 81, pp. 5824-26 (1959); "Organic Peroxides", Swern, D. editor, Wiley-Interscience, New York (1970); and Houben-Weyl Methoden der Organische Chemie, El 3, Volume 1, page 736, for example.

Examples of cyclic peroxides include those derived from acetone, methylamyl ketone, methylheptyl ketone, methylhexyl ketone, methylpropyl ketone, methylbutyl ketone, diethyl ketone, methylethyl ketone methyloctyl ketone, methylnonyl ketone, methyldecyl ketone, methylundecyl ketone and combinations thereof, among others. The cyclic peroxides can be used alone or in combination with one another.

In one or more embodiments, the free radical generator may be 3,6,9-triethyl-3-6-9-trimethyl-1,4,7-triperoxonane, which is commercially available from AkzoNobel under the trade designation TRIGONOX® 301. The free radical generator used herein can be liquid, solid, or paste, e.g., depending on the melting point of the free radical generator and the diluent, if any, within which it is carried.

Embodiments of the present disclosure provide that the compositions, which may be utilized to form the modified polyethylenes, can include 5 to 100 ppm of the free radical generator based upon the polyethylene. All individual values and subranges from 5 to 100 ppm are included; for example, the free radical generator can be from a lower limit of 5, 7.5, 10, 12.5, 15, 17.5, or 20 to an upper limit of 100, 90, 80, 70, or 60 ppm based upon the polyethylene.

One or more embodiments of the present disclosure provide that the compositions, which may be utilized to form the modified polyethylenes, may include a primary antioxidant. The primary antioxidant may be utilized at a concentration of less than or equal to 2000 ppm based upon the polyethylene. All individual values and subranges of less than or equal to 2000 ppm of primary antioxidant based upon the polyethylene are included and disclosed herein. For example, in one or more embodiments, the composition may comprise from a lower limit of 0, 10, 25, 50, 100, 200, 300, 400, 500, 600, 700, 800, 900, 1000, 1100, 1200, 1300, 1400, 1500, 1600, 1700, 1800, or 1900 ppm to an upper limit of 15, 30, 50, 75, 100, 150, 250, 350, 450, 550, 650, 750, 850, 950, 1000, 1050, 1150, 1250, 1350, 1450, 1500, 1550, 1650, 1750, 1850, 1950, or 2000 ppm of primary antioxidant based upon the polyethylene. Primary antioxidants can be described as radical scavengers that are generally organic molecules consisting of hindered phenols or hindered amine derivatives. Examples of primary antioxidants include primary antioxidants that are well known in the polyolefin industry, such as, pentaerythrityl tetrakis(3-(3,5-di-tert-butyl-4-hydroxyphenol)propionate), which is commercially available from BASF under the name of IRGANOX™ 1010, or octadecyl 3-(3,5-di-tert-butyl-4-hydroxyphenyl)propionate, which is commercially available from BASF under the name IRGANOX™ 1076.

One or more embodiments of the present disclosure provide that the compositions, which may be utilized to form the modified polyethylenes, may include a secondary antioxidant. The secondary antioxidant may be utilized at a concentration of less than or equal to 3000 ppm based upon the polyethylene. All individual values and subranges of less than or equal to 3000 ppm of secondary antioxidant based upon the polyethylene are included and disclosed herein. For example, in one or more embodiments, the composition may comprise from a lower limit of 0, 10, 25, 50, 100, 200, 300, 400, 500, 600, 700, 800, 900, 1000, 1100, 1200, 1300, 1400, 1500, 1600, 1700, 1800, or 1900 ppm to an upper limit of 900, 950, 1000, 1250, 1550, 2000, 2500, 2750, or 3000 ppm of secondary antioxidant based upon the polyethylene. Secondary antioxidants may decompose hydroperoxides and are generally organic molecules consisting of phosphites, phosphonites, or thio compounds. An example of a secondary antioxidant is tris(2,4-ditert-butylphenyl) phosphite, which is commercially available from BASF under the name IRGAFOS™ 168, or tris(nonylphenyl) phosphite.

Some embodiments of the present disclosure provide that the compositions, which may be utilized to form the modified polyethylenes, may include one or more additives. The one or more additives may be utilized at a concentration of less than or equal to 0.5 wt % based upon a total weight of the polyethylene utilized. All individual values and subranges of less than or equal to 0.5 wt % based upon a total weight of the polyethylene utilized are included and disclosed herein. For example, in one or more embodiments, the one or more additives may be from a lower limit of 0.01, 0.05, or 0.1 to an upper limit of 0.5, 0.45, or 0.4 wt % based upon a total weight of the polyethylene utilized. Examples of the one or more additives include, but are not limited to, tackifiers, waxes, functionalized polymers such as acid modified polyolefins and/or anhydride modified polyolefins, oils, compatibilizers, fillers, adjuvants, adhesion promoters, plasticizers, low molecular weight polymers, blocking agents, antiblocking agents, anti-static agents, release agents, anti-cling additives, colorants, dyes, pigments, processing aids, UV stabilizers, heat stabilizers, neutralizers, lubricants, surfactants, nucleating agents, flexibilizers, rubbers, optical brighteners, colorants, diluents, viscosity modifiers, oxidized polyolefins, and combination thereof, among others. Different amounts of the one or more additives may be utilized for various applications.

One or more embodiments of the present disclosure provide that a masterbatch may be utilized. In other words, a number of components of a composition, which may be utilized to form a modified polyethylene, may be combined with one another to form a masterbatch. Thereafter, an additional number of components may be combined with the masterbatch to form the composition.

Embodiments of the present disclosure provide that the modified polyethylenes can be formed by compounding the compositions disclosed herein. In other words, components of the compositions can be reacted, e.g., with one another, to form the modified polyethylenes. As used herein, modified polyethylene can be described as a post-reactor modified polyethylene. In other words, polyethylene can be formed in a polymerization reactor, and thereafter modified polyethylenes can be formed by compounding the compositions disclosed herein.

Compounding the compositions disclosed herein may utilize known compounding equipment. Examples of suitable compounding equipment include mixers, kneaders, and extruders, for instance. In one or more embodiments, the compounding of the composition may utilize an extruder, e.g., a screw extruder. The extruder may further be attached to a blown-film or cast film line. In one or more embodiments, the compounding of the composition takes place in an extruder attached to a blown-film or cast film line.

Embodiments of the present disclosure provide that the compositions disclosed herein can be compounded at a temperature in a range from 120° C. to 300° C. All individual values and subranges from 120° C. to 300° C. are included; for example, the compositions disclosed herein can be compounded at a temperature in a range having a lower limit of 120° C., 125° C., 130° C., 135° C., 140° C., 145° C., or 150° C. to an upper limit of 300° C., 295° C., 290° C., 285° C., 280° C., 275° C., or 1270° C.

Examples of extruder and/or kneader equipment include, for instance, single-screw extruders, contra-rotating and co-rotating twin-screw extruders, planetary-gear extruders, ring extruders, and co-kneaders. Suitable extruders and kneaders are further described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7).

The screw length can range from 1-60 times the screw diameter, or 35-48 times the screw diameters, for instance. The rotational speed of a screw may range from 10-600 rotations per minute (rpm), or 25-300 rpm, for instance. A maximum throughput may depend on the screw diameter, the rotational speed, and the driving force. A level lower than the maximum throughput may be utilized by varying the parameters mentioned and/or employing weighing machines delivering particular dosage amounts.

As discussed, embodiments of the present disclosure provide that the modified polyethylenes can be formed by compounding, e.g., reacting, the compositions disclosed herein. These modified polyethylenes may be utilized to form articles, e.g., a film or a pipe, that are useful for a number applications including agricultural films, thermoformed films, collation shrink applications, blow molding applications, extrusion coating, and pipe applications, among others. Advantageously, these modified polyethylenes can provide an improved gel count, and/or an improved melt strength, as compared to other polyethylenes. Further, these modified polyethylenes can have a melt index that is maintained at a higher level, as compared to other polyethylenes, to provide a particular melt strength.

EXAMPLES

In the Examples, various terms and designations for materials are used including, for instance, the following:

DOWLEX™ NG2045B (polyethylene, LLDPE, available from The Dow Chemical Company); Polyethylene-1 (DOWLEX™ 2047 with IRGAFOS® 168 [1200 ppm] and calcium stearate [1000 to 1500 ppm], polyethylene, LLDPE, available from The Dow Chemical Company); IRGAFOS® 168 (secondary antioxidant, tris(2,4-ditert-butylphenyl) phosphite, available from CIBA®); TRIGONOX® 301(free radical generator, peroxide, 3,6,9-triethyl-3,6,9-trimethyl-1,4,7-triperoxonane) available from Akzo Nobel); SR-399NS (multifunctional co-agent; dipentaerythritol pentaacrylate, available from Sartomer); SR-351NS (multifunctional co-agent; trimethylolpropane triacrylate, available from Sartomer).

Masterbatch-1 was formed as follows. DOWLEX™ NG2045B (with IRGAFOS®168 concentration of 1000 ppm) was ground into powder. The ground DOWLEX™ NG2045B, methyl ethyl ketone (solvent), a free radical generator, and a multifunctional co-agent were placed into a container and the contents of the container were mixed for three minutes at 1000 rpm. Then, the contents of the container were placed in a hood for approximately 48 hours to evaporate the methyl ethyl ketone and provide masterbatch-1.

Masterbatch-2 was formed as masterbatch-1 with the change that a different concentration of the multifunctional co-agent was utilized.

Masterbatch-3 was formed as masterbatch-1 with the change that 80 weight percent DOWLEX™ NG2045B (with IRGAFOS®168 concentration of 1000 ppm) and 20 weigh percent Polyethylene-1 was utilized as the polyethylene, rather than 100 weight percent DOWLEX™ NG2045B.

Masterbatch-4 was formed as masterbatch-3 with the change a different multifunctional co-agent was utilized.

Masterbatch-A was formed as masterbatch-1 with the change the multifunctional co-agent was not utilized.

Masterbatch-B, masterbatch-C, and masterbatch-D were formed as masterbatch-A with the change different respective amounts of the free radical generator were utilized.

Masterbatch-E was formed as masterbatch-A with the change that 80 weight percent DOWLEX™ NG2045B (with IRGAFOS®168 concentration of 1000 ppm) and 20 weigh percent Polyethylene-1 was utilized as the polyethylene, rather than 100 weight percent DOWLEX™ NG2045B.

Example 1, a method for preparing a modified polyethylene, was performed as follows. Masterbatch-1 (2 kg/h) powder and DOWLEX™ NG2045B (8 kg/h) were fed to a twin screw extruder for compounding. The twin screw extruder had a screw diameter of 27 mm, a screw speed of 200 rpm, and a total output rate of 10 kg/h. The twin screw extruder had twelve zone with temperatures respectively maintained from approximately 160° C. to approximately 200° C. Melt temperature at the die was approximately 225° C. The residence time was approximately 52 seconds. A product, i.e. a modified polyethylene, was output from the extruder as a melt strand. The melt strand was cooled through a water pool, cut into pellets, and dried.

Example 2, a method for preparing a modified polyethylene, was performed as Example 1 with the change that masterbatch-2 was utilized rather than masterbatch-1.

Example 3, a method for preparing a modified polyethylene, was performed as Example 1 with the change that masterbatch-3 was utilized rather than masterbatch-1.

Example 4, a method for preparing a modified polyethylene, was performed as Example 1 with the change that masterbatch-4 was utilized rather than masterbatch-1.

Comparative Examples A-E were performed as Example 1 with the changes that masterbatches A-E were respectively utilized rather than masterbatch-1.

A Reference Example was performed as Example 1 with the change that DOWLEX™ NG2045B (10 kg/h) was utilized rather than a masterbatch.

The types and amounts of free radical generator, multifunctional co-agent, and polyethylene, e.g., the respective compositions, utilized for Examples 1-4, Comparative Examples A-E, and the Reference Example are reported in Table 1, based upon the respective polyethylene utilized.

TABLE 1

| | Trigonox 301 (Free radical generator) | Dipentaerythritol pentaacrylate (multifunctional co-agent) | Trimethylolpropane triacrylate (multifunctional co-agent) | Polyethylene |
|---|---|---|---|---|
| Reference Example Composition | — | — | — | DOWLEX™ NG2045B (10 kg/h) |
| Comparative Example A Composition | 21 ppm (based on polyethylene) | — | — | Masterbatch A (2 kg/h); DOWLEX™ NG2045B (8 kg/h) |
| Example 1 Composition | 21 ppm (based on polyethylene) | 632 ppm (based on polyethylene) | — | Masterbatch 1 (2 kg/h); DOWLEX™ NG2045B (8 kg/h) |
| Comparative Example B Composition | 40 ppm (based on polyethylene) | — | — | Masterbatch B (2 kg/h); DOWLEX™ NG2045B (8 kg/h) |
| Example 2 Composition | 40 ppm (based on polyethylene) | 632 ppm (based on polyethylene) | — | Masterbatch 2 (2 kg/h); DOWLEX™ NG2045B (8 kg/h) |
| Comparative Example C Composition | 80 ppm (based on polyethylene) | — | — | Masterbatch C (2 kg/h); DOWLEX™ NG2045B (8 kg/h) |
| Comparative Example D Composition | 120 ppm (based on polyethylene) | — | — | Masterbatch D (2 kg/h); DOWLEX™ NG2045B (8 kg/h) |

TABLE 1-continued

|  | Trigonox 301 (Free radical generator) | Dipentaerythritol pentaacrylate (multifunctional co-agent) | Trimethylolpropane triacrylate (multifunctional co-agent) | Polyethylene |
|---|---|---|---|---|
| Comparative Example E Composition | 21 ppm (based on polyethylene) | — | — | Masterbatch E (2 kg/h); DOWLEX ™ NG2045B (8 kg/h) |
| Example 3 Composition | 21 ppm (based on polyethylene) | 632 ppm (based on polyethylene) | — | Masterbatch 3 (2 kg/h); DOWLEX ™ NG2045B (8 kg/h) |
| Example 4 Composition | 21 ppm (based on polyethylene) | — | 594 ppm (based on polyethylene) | Masterbatch 4 (2 kg/h); DOWLEX ™ NG2045B (8 kg/h) |

Modified polyethylenes formed from Example 1, Example 2, and polyethylenes formed from Comparative Example A, Comparative Example B, and Comparative Example D were cast into respective films, utilizing a Model OCS ME 20 Extruder (available from OCS Optical Control System GmbH) with a screw speed of 70 rpm, for obtaining gel count measurements. The gel count measurements were determined with an OCS FS-3 line gel counter including a lighting unit, a charge coupled device (CCD) detector and an image processor with gel counter software, available from OCS Optical Control System GmbH. For each of the gel count measurements, a respective unit sample volume of 24.6 cc was inspected. A sample volume of 24.6 cc corresponds to an inspected area of 0.323 m², of a 76 μm thick film. The total area of all gels with diameter>200 μm (GI200) was determined in each measurement. Fifty such measurements were carried out. The average value and standard deviation of the total gel area was calculated based on the fifty measurements. The gel spec limits were applied to the avg and (avg+2stdev) values. GI 200=avg (large+medium+small+micro) gel area=gel area expressed in mm² per 24.6 cc sample inspected. GI 200 stdev=(avg+2 stdev) (large+medium+small+micro) gel area expressed in mm² per 24.6 cc sample inspected. The results are reported in Table 2.

generator, where the free radical generator is from 5 to 100 ppm based upon the polyethylene, and the multifunctional co-agent, where the multifunctional co-agent is from 100 to 2000 ppm based upon the polyethylene, have improved gel count measurements compared to the polyethylenes formed from other compositions. For instance, the modified polyethylene formed from Example 1 had an improved, i.e. decreased, gel count measurement (GI 200 of 13.44) as compared to the polyethylene formed from Comparative Example A (GI 200 of 29.93). Also, the modified polyethylene formed from Example 2 had an improved gel count measurement (GI 200 of 11.13) as compared to the polyethylene formed from Comparative Example B (GI 200 of 30.14).

Additionally, data of Table 2 illustrates that modified polyethylenes formed from the compositions including the free radical generator, where the free radical generator is from 5 to 100 ppm based upon the polyethylene, and the multifunctional co-agent, where the multifunctional co-agent is from 100 to 2000 ppm based upon the polyethylene, have improved gel count measurements compared to the polyethylenes formed from other compositions, e.g. compositions including a greater concentration of free radical generator, which would be necessary to provide a comparable melt strength, while lacking the multifunctional

TABLE 2

|  | Polyethylene formed from Comparative Example A | Modified Polyethylene formed from Example 1 | Polyethylene formed from Comparative Example B | Modified Polyethylene formed from Example 2 | Polyethylene formed from Comparative Example D |
|---|---|---|---|---|---|
| Area Inspected (m²) | 16.1 | 16.11 | 16.11 | 16.11 | 16.11 |
| Average Film Thickness (μm) | 76.0 | 77.0 | 75.8 | 77.0 | 76.5 |
| GI 200 (total area of all gels with diameter > 200 μm) | 29.93 | 13.44 | 30.14 | 11.13 | 36.98 |
| GI 200 + 2 stdev | 35.26 | 24.45 | 46.3 | 16.97 | 46.42 |

The data of Table 2 illustrates that modified polyethylenes formed from the compositions including the free radical co-agent. For instance, the modified polyethylenes formed from Examples 1 and 2 each had an improved gel count measurement (GI 200 of 13.44; GI 200 of 11.13) as compared to the polyethylene formed from Comparative Example D (GI 200 of 36.98).

Melt strength measurements for modified polyethylenes formed from Examples 1-4, and polyethylenes formed from Comparative Examples A-E, and the Reference Example were respectively conducted on a Gottfert Rheotens 71.97 (Goettfert Inc.; Rock Hill, S.C.), attached to a Gottfert Rheotester 2000 capillary rheometer. The respected melted samples (approximately 20 g) were fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the respective samples at 190° C. for 10 min, the piston was run at a constant piston speed of 0.265 mm/s; the standard test temperature was 190° C. The respective samples were drawn uni-axially to a set of accelerating nips located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/s; wheel acceleration=2.4 mm/s$^2$; capillary diameter=2.0 mm; capillary length=30 mm; and barrel diameter=12 mm. The melt strengths are reported in Table 3.

Melt index for modified polyethylenes formed from Examples 1-4, and polyethylenes formed from Comparative Examples A-E, and the Reference Example were respectively measured in accordance with ASTM D1238, Condition 190° C./2.16 kg, and is reported in grams eluted per 10 minutes (g/10 min). The melt indexes are reported in Table 3.

TABLE 3

|  | Melt Strength (cN) | Melt Index (g/10 min) |
|---|---|---|
| Polyethylene formed from Reference Example | 4.5 | 0.87 |
| Polyethylene formed from Comparative Example A | 6.6 | 0.56 |
| Modified Polyethylene formed from Example 1 | 9.5 | 0.38 |
| Polyethylene formed from Comparative Example B | 7.4 | 0.44 |
| Modified Polyethylene formed from Example 2 | 10.6 | 0.30 |
| Polyethylene formed from Comparative Example C | 8.8 | 0.28 |
| Polyethylene formed from Comparative Example D | 9.6 | 0.18 |
| Polyethylene formed from Comparative Example E | 4.5 | 0.72 |

TABLE 3-continued

|  | Melt Strength (cN) | Melt Index (g/10 min) |
|---|---|---|
| Modified Polyethylene formed from Example 3 | 6.8 | 0.46 |
| Modified Polyethylene formed from Example 4 | 7.1 | 0.42 |

The data of Table 3 illustrates that modified polyethylene formed from the compositions including the free radical generator, where the free radical generator is from 5 to 100 ppm based upon the polyethylene, and the multifunctional co-agent, where the multifunctional co-agent is from 100 to 2000 ppm based upon the polyethylene, have improved melt strength compared to the polyethylene formed from other compositions. For instance, the modified polyethylene formed from Example 1 had 44% increased melt strength as compared to the polyethylene formed from Comparative Example A. Also, the modified polyethylene formed from Example 2 had 43% increased melt strength as compared to the polyethylene formed from Comparative Example B.

It is noted that utilizing the multifunctional co-agent resulted in a decrease of melt index for the modified polyethylenes formed respectively from Examples 1 and 2, as compared to the polyethylenes formed from Comparative Examples A and B. However, in order to achieve a similar melt strength, e.g. the polyethylenes formed from Comparative Examples C and D have similar melt strengths to the modified polyethylenes formed from Examples 1 and 2, the combination of the free radical generator, where the free radical generator is from 5 to 100 ppm based upon the polyethylene, and the multifunctional co-agent, where the multifunctional co-agent is from 100 to 2000 ppm based upon the polyethylene, can maintain the melt index at a much higher level than using higher concentrations of the free radical generator alone, as the polyethylenes formed from Comparative Examples C and D have lower melt indexes than the modified polyethylenes formed from Examples 1 and 2. For instance, the melt index of the modified polyethylenes formed from Example 1 is higher than that of the polyethylene formed from Comparative Example D, while they have comparable melt strengths. Also, the modified polyethylenes formed from Example 1 have both higher melt strength and melt index than the polyethylene formed from Comparative Example C.

Additionally, the data of Table 3 illustrates that similar results are achieved by the varying polyethylenes and/or the multifunctional co-agent, as the modified polyethylenes formed respectively from Examples 3 and 4 both have increased melt strength as compared to the polyethylene formed from Comparative Example E.

Molecular weight/molecular weight distribution and a Mark-Houwink plot for branching structure analysis were measured and prepared using Triple Detector Gel Permeation Chromatography for modified polyethylenes formed from Example 1, Example 2, and polyethylenes formed from Comparative Example A, Comparative Example B, Comparative Example D, and the Reference Example. The processes and equations utilized are described in U.S. Pat. No. 8,871,887. U.S. Pat. No. 8,871,887 is incorporated by reference. The molecular weight/molecular weight distributions are reported in Table 4; the Mark-Houwink plot is illustrated in FIG. 1. "Mn" refers to number average molecular weight, "Mw" refers to weight average molecular weight, and "Mz" refers to z-average molecular weight.

For the Gel Permeation Chromatography (GPC) processes (Conventional GPC, Light Scattering (LS) GPC, Viscometry GPC and gpcBR), a Triple Detector Gel Permeation Chromatography (3D-GPC or TDGPC) system was utilized. This system included a Robotic Assistant Delivery (RAD) high temperature GPC system [other suitable high temperature GPC instruments include Waters (Milford, Mass.) model 150C High Temperature Chromatograph; Polymer Laboratories (Shropshire, UK) Model 210 and Model 220; and Polymer Char GPC-IR (Valencia, Spain)], equipped with a Precision Detectors (Amherst, Mass.) 2-angle laser light scattering (LS) detector Model 2040, an IR4 infra-red detector from Polymer ChAR (Valencia, Spain), and a 4-capillary solution viscometer (DP) (other suitable viscometers include Viscotek (Houston, Tex.) 150R 4-capillary solution viscometer (DP)). A GPC with these latter two independent detectors and at least one of the former detectors can be referred to as "3D-GPC" or "TDGPC," while the term "GPC" alone generally refers to conventional GPC. Data collection was performed using software, e.g., Polymer Char GPC-IR. The system was also equipped with an on-line solvent degassing device, e.g., from Polymer Laboratories. Eluent from the GPC column set flowed through each detector arranged in series, in the following order: LS detector, IR4 detector, then DP detector. The systematic approach for the determination of multi-detector offsets was performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)). Olexis LS columns were used. The sample carousel compartment was operated at 140° C. and the column compartment was operated at 150° C. The samples were prepared at a concentration of 0.1 grams of polymer in 50 milliliters of solvent. The chromatographic solvent and the sample preparation solvent was 1,2,4-trichlorobenzene (TCB) containing 200 ppm of 2,6-di-tert-butyl-4methylphenol (BHT). The solvent was sparged with nitrogen. The polymer samples were gently stirred at 160° C. for four hours. The injection volume was 200 microliters. The flow rate through the GPC was set at 1 ml/minute. For Conventional GPC, the IR4 detector was used, and the GPC column set was calibrated by running 21 narrow molecular weight distribution polystyrene standards. The molecular weight of the standards ranged from 580 g/mol to 8,400,000 g/mol, and the standards were contained in six "cocktail" mixtures. Each standard mixture had at least a decade of separation between individual molecular weights. The polystyrene standards were prepared at 0.025 g in 50 mL of solvent for molecular weights equal to, or greater than, 1,000,000 g/mol, and at 0.05 g in 50 mL of solvent for molecular weights less than 1,000,000 g/mol. The polystyrene standards were dissolved at 80° C., with gentle agitation, for 30 minutes. The number average molecular weight, the weight average molecular weight, and the z-average molecular weight were calculated from equations, e.g., as described in U.S. Pat. No. 8,871,887. For the LS GPC, the Precision Detector PDI2040 detector Model 2040 was used. For 3D-GPC, absolute weight average molecular weight was calculated from equations, e.g., as described in U.S. Pat. No. 8,871,887. The gpcBR branching index was determined by calibrating the light scattering, viscosity, and concentration detector and subtracting the baselines. Integration windows were set for integration of the low molecular weight retention volume range in the light scattering and viscometer chromatograms that indicated the presence of detectable polymer from the refractive index chromatogram. Linear polyethylene standards were used to establish polyethylene and polystyrene Mark-Houwink constants. The constants were used to construct two linear references, conventional calibrations for polyethylene molecular weight and polyethylene intrinsic viscosity as a function of elution volume, e.g., as described in U.S. Pat. No. 8,871,887. To determine the gpcBR branching index, the light scattering elution area for the sample polymer was used to determine the molecular weight of the sample. Analyzation was performed using the final Mark-Houwink constants, e.g., as described in U.S. Pat. No. 8,871,887.

TABLE 4

|  | Conventional GPC | | | | Absolute GPC | | | | Mw(Abs) |
| --- | --- | --- | --- | --- | --- | --- | --- | --- | --- |
|  | Mn | Mw | Mz | Mw/Mn | Mn | Mw | Mz | Mz/Mw | Mw(Con) |
| Polyethylene formed from Reference example | 26,108 | 117,985 | 420,131 | 4.52 | 24,890 | 124,422 | 466,874 | 4.44 | 1.05 |
| Polyethylene formed from Comparative Example A | 26,660 | 119,508 | 397,246 | 4.48 | 26,619 | 125,479 | 434,540 | 3.98 | 1.05 |
| Modified Polyethylene formed from Example 1 | 27,235 | 134,734 | 513,247 | 4.95 | 27,023 | 151,667 | 613,252 | 5.51 | 1.13 |
| Polyethylene formed from Comparative Example B | 27,128 | 120,491 | 392,727 | 4.44 | 28,477 | 127,676 | 428,056 | 3.81 | 1.06 |
| Modified Polyethylene formed from Example 2 | 27,284 | 140,768 | 557,780 | 5.16 | 27,704 | 163,353 | 681,214 | 6.04 | 1.16 |
| Polyethylene formed from Comparative Example D | 27,817 | 123,860 | 388,836 | 4.45 | 27,616 | 133,076 | 430,547 | 3.75 | 1.07 |

The data of Table 4 illustrates that modified polyethylenes formed from the compositions including the free radical generator, where the free radical generator is from 5 to 100 ppm based upon the polyethylene, and the multifunctional co-agent, where the multifunctional co-agent is from 100 to 2000 ppm based upon the polyethylene, have a broader distribution [Mw(Abs)/Mw(Con)] compared to the polyethylenes formed from other compositions. For instance, the modified polyethylene formed from Example 1 had a broader distribution (1.13) as compared to the polyethylene formed from Comparative Example A (1.05). Also, the modified polyethylene formed from Example 2 had a broader distribution (1.16) as compared to the polyethylene formed from Comparative Example B (1.06).

Additionally, data of Table 4 illustrates that modified polyethylenes formed from the compositions including the free radical generator, where the free radical generator is from 5 to 100 ppm based upon the polyethylene, and the multifunctional co-agent, where the multifunctional co-agent is from 100 to 2000 ppm based upon the polyethylene, have a broader distribution compared to the polyethylenes formed from other compositions, e.g., compositions including a greater concentration of free radical generator, which would be necessary to provide a comparable melt strength, while lacking the multifunctional co-agent. For instance, the modified polyethylenes formed from Examples 1 and 2 each had a broader distribution (1.13; 1.16) as compared to the polyethylene formed from Comparative Example D (1.07).

Without being bound to theory, this broader distribution may be a result of the presence of a high Mw component having a high branching structure. Advantageously, this broader distribution may help maintain the melt index.

FIG. 1 is a Mark-Houwink plot for a number of modified polyethylenes formed from the compositions including the free radical generator, where the free radical generator is from 5 to 100 ppm based upon the polyethylene, and the multifunctional co-agent, where the multifunctional co-agent is from 100 to 2000 ppm based upon the polyethylene; polyethylenes formed from other compositions including a free radical generator while lacking the multifunctional co-agent; and a polyethylene formed from a composition not including a free radical generator.

FIG. 1 includes plot 116 corresponding to a polyethylene homopolymer that was processed under the conditions of Example 1. Plot 102 corresponds to the modified polyethylene formed from Example 1 and plot 104 corresponds to the modified polyethylene formed from Example 2. As illustrated in FIG. 1, plot 102 and 104 each exhibit clear and larger deviations from plot 116, as compared to plot 106 corresponding to polyethylene formed from the Reference Example, plot 108 corresponding to polyethylene formed from the Comparative Example A, plot 110 corresponding to polyethylene formed from the Comparative Example B, and plot 112 corresponding to polyethylene formed from the Comparative Example D. As illustrated in FIG. 1, the plots 106, 108, 110, and 112 each terminate near each other in an area indicated by circle 114. The larger deviations of plot 102 and plot 104 from plot 116, as compared to plots 106, 108, 110, and 112 indicate that the combination of the free radical generator and the multifunctional co-agent, utilized at the concentrations disclosed herein, resulted in higher branching level than when utilizing only the free radical generator, as with polyethylenes formed from Comparative Examples A and B, and even when utilizing only the free radical generator in higher concentrations, as with the polyethylene formed from Comparative Example D. Without being bound to theory, the higher branching level may help maintain low viscosity of the modified polyethylenes, i.e. help maintain the melt index at level desirable for a number of applications.

Modified polyethylene formed from Example 1 and polyethylenes formed from Comparative Examples A, B, and D, and the Reference Example were compression-molded into 2 mm thick plaque at 160° C. for five minutes under 20 MPa pressure in air. A circular plaque was cut from the whole plaque sample for Dynamic Mechanical Spectroscopy (DMS). A constant temperature frequency sweep was performed using a TA Instruments ARES-G2, equipped with 25 mm (diameter) parallel plates under a nitrogen purge. The DMS runs were performed at 190° C. over a frequency range of 0.1 to 100 rad/s. The strain amplitude was constant at 5%. The complex viscosity was calculated from the stress response and plotted as function of frequency. The results are reported in FIG. 2.

Figure 2:
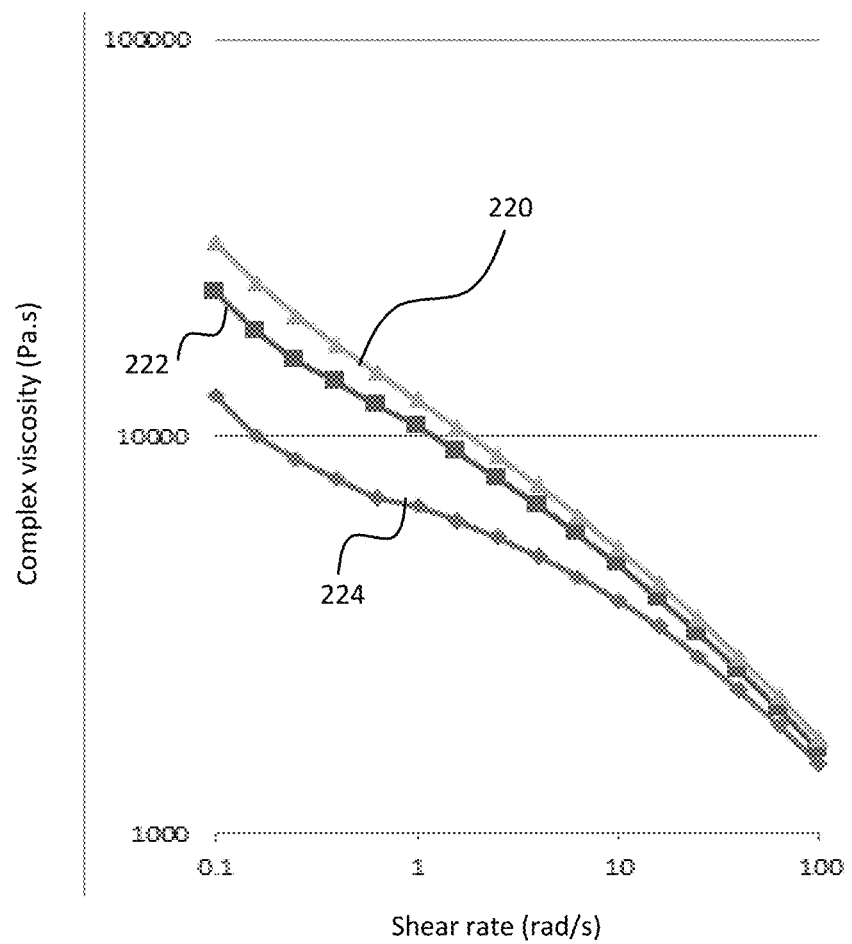
FIG. 2 illustrates Dynamic Mechanical Spectroscopy plots for a number of modified polyethylenes formed from the compositions including the free radical generator and the multifunctional co-agent according to one or more embodiments disclosed herein; for polyethylene formed from compositions including a free radical generator while lacking the multifunctional co-agent; and for polyethylene formed from a composition not including a free radical generator.

FIG. 2 illustrates Dynamic Mechanical Spectroscopy plots for a number of modified polyethylenes formed from the compositions including the free radical generator and the multifunctional co-agent according to one or more embodiments disclosed herein; polyethylenes formed from compositions including a free radical generator while lacking the multifunctional co-agent; and a polyethylene formed from a composition not including a free radical generator Shear thinning behavior can be an important processing parameter for a number of applications. For FIG. 2, the DMS curves indicate a change of viscosity with shear frequency. As illustrated in FIG. 2, plot 220, which corresponds to the modified polyethylene formed from Example 1, and plot 222, which corresponds to the polyethylene formed from Comparative Example A, each indicate improved shear thinning behavior, i.e. relatively increased slopes, as compared to plot 224, which corresponds to the polyethylene formed from the Reference Example. This indicates that the modified polyethylene formed from Example 1 has a desirable processability at relatively high shear frequency, for a number of applications such as a blown film process, for instance.

What is claimed:
1. A composition comprising:
polyethylene;
a multifunctional co-agent having a functionality of 3 or greater, where the multifunctional co-agent is from 100 to 2000 ppm based upon the polyethylene; and
a free radical generator, where the free radical generator is from 5 to 80 ppm based upon the polyethylene.
2. The composition of claim 1, wherein the polyethylene is selected from the group consisting of linear low density polyethylene (LLDPE), metallocene catalyzed linear low density polyethylene (mLLDPE), high density polyethylene (HDPE), medium density polyethylene (MDPE), very low density polyethylene (VLDPE), and combinations thereof.
3. The composition of claim 1, wherein the multifunctional co-agent is selected from the group consisting of acrylate compounds, methacrylate compounds, vinyl compounds, allylic compounds, and combinations thereof.
4. The composition of claim 1, wherein the free radical generator is selected from the group consisting of peroxides, alkoxy amine derivatives, azo compounds, and combinations thereof.
5. An article formed from the composition of claim 1.

6. A method for forming a modified polyethylene comprising:
compounding a composition including:
polyethylene;
a multifunctional co-agent having a functionality of 3 or greater, where the multifunctional co-agent is from 100 to 2000 ppm based upon the polyethylene; and
a free radical generator, where the free radical generator is from 5 to 80 ppm based upon the polyethylene.

7. The method of claim 6, wherein the compounding includes screw extruding the polyethylene, the multifunctional co-agent having the functionality of 3 or greater, and the free radical generator.

8. The method of claim 6, wherein the polyethylene is selected from the group consisting of LLDPE, mLLDPE, HDPE, MDPE, VLDPE, and combinations thereof.

9. The method of claim 6, wherein the multifunctional co-agent is selected from the group consisting of acrylate compounds, methacrylate compounds, vinyl compounds, allylic compounds, and combinations thereof.

10. The method of claim 6, wherein the free radical generator is selected from the group consisting of peroxides, alkoxy amine derivatives, azo compounds, and combinations thereof.

11. A modified polyethylene formed by the method of claim 6.

\* \* \* \* \*